United States Patent
Ross

[11] 3,715,212
[45] Feb. 6, 1973

[54] PHOTOCHROMIC DISPLAY AND STORAGE DEVICE AND METHOD OF OPERATION THEREOF

[75] Inventor: Daniel Louis Ross, Princeton, N.J.
[73] Assignee: RCA Corp.
[22] Filed: Dec. 7, 1970
[21] Appl. No.: 95,578

[52] U.S. Cl............................96/48, 96/89, 96/90 PC
[51] Int. Cl..............................G03c 5/24, G03c 1/72
[58] Field of Search...........................96/48, 90 PC, 89

[56] References Cited

UNITED STATES PATENTS

| | | | |
|---|---|---|---|
| 3,421,894 | 1/1968 | Baum | 96/48 |
| 3,595,657 | 7/1971 | Robinson et al. | 96/48 |
| 3,595,659 | 7/1971 | Gerlach et al. | 96/48 |

Primary Examiner—J. Travis Brown
Assistant Examiner—Alfonso T. Suro Pico
Attorney—Glenn H. Bruestle

[57] ABSTRACT

A photochromic display and storage element having a relatively high photochromic efficiency at temperatures above room temperature and a relatively low photochromic efficiency at room temperature consists of a substituted thioindigo dye dissolved in a heat-cured epoxy resin having a glass transition temperature of between above room temperature and 100°C. Information is placed on the element by heating it to or above the glass transition temperature and shining light of a first wavelength (write light) on the element. The image is stored by cooling the element to room temperature. In order to read the image, light of a second wavelength (read light) is passed through the element at room temperature. The image is erased with light of this second wavelength by first heating the element to or above the glass transition temperature.

9 Claims, 3 Drawing Figures

INVENTOR.
*Daniel L. Ross*
BY
ATTORNEY

PHOTOCHROMIC DISPLAY AND STORAGE DEVICE AND METHOD OF OPERATION THEREOF

BACKGROUND OF THE INVENTION

This invention relates to a novel photochromic information display and storage element and a method of operation thereof. More particularly, this invention relates to a specific class of photochromic compounds dissolved in a specific type of polymer so as to result in an essentially non-fatiguing photochromic element particularly useful in combination with lasers as the means for writing information thereon and a method of operating these photochromic elements.

Photochromic compounds are well known in the art, as is the usage thereof for such applications as temporary data storage devices. Photochromism in the compounds useful in the novel photochromic elements is due to light induced transformation of cis-trans isomeric forms of the compounds. Photochromism due to cis-trans isomerism is well known, and, is in fact known in the compounds included in the novel photochromic element. However, no photochromic elements have been reported wherein there is a significantly great temperature dependence of the photochromic efficiency in the temperature range of from 0° to 100°C which would, in a practical manner, allow one to write information at elevated temperatures with a relatively high photochromic efficiency and read the information stored in the photochromic element at room temperature where the photochromic efficiency is substantially less than that at the elevated temperature. A photochromic element of this type possesses an essentially non-destructive or non-fatiguing read-out property at room temperature due to its low switching efficiency at this temperature. Generally, the prior art photochromic elements have essentially the same photochromic quantum efficiency at temperatures in the range from 0° to 100°C. Consequently, in these prior art elements, upon repeatedly reading the stored information at room temperature substantial erasure of the information at room temperature occurs unless a very low intensity read light is employed. Also, upon raising the temperature of these prior art elements above room temperature, the stored information may be thermally erased. The novel photochromic elements described herein maintain the stored information even after repeated reading of the information at room temperature.

SUMMARY OF THE INVENTION

A photochromic element comprises in combination an indigoid dye dissolved in a cross-linked resin having a glass transition temperature between greater than room temperature and about 100°C.

The novel element is used to store and portray information by first heating the element above the glass transition temperature, then writing information as an image on said element by means of electromagnetic radiation of a first wavelength. The element is then cooled to room temperature thus storing the image therein. The stored image is read at a temperature below the glass transition temperature employing light of a wavelength at which there was a significant change in absorption upon writing. This may be light of the first wavelength or light of a second wavelength. The image or a part thereof is preferably erased by heating the element above the glass transition temperature and irradiating the element with light of a wavelength that will effect erasure of the image.

The glass transition temperature of a polymer is characteristic of the amorphous phase of a polymer. It is defined as that temperature, generally the mean temperature over a small temperature range, at which a vitreous phase exhibits with changing temperature a more or less sudden change in the derivative thermodynamic properties, such as heat capacity and expansion coefficient, from crystal like to liquid-like values.

DESCRIPTION OF THE PREFERRED EMBODIMENTS

Figure 1:
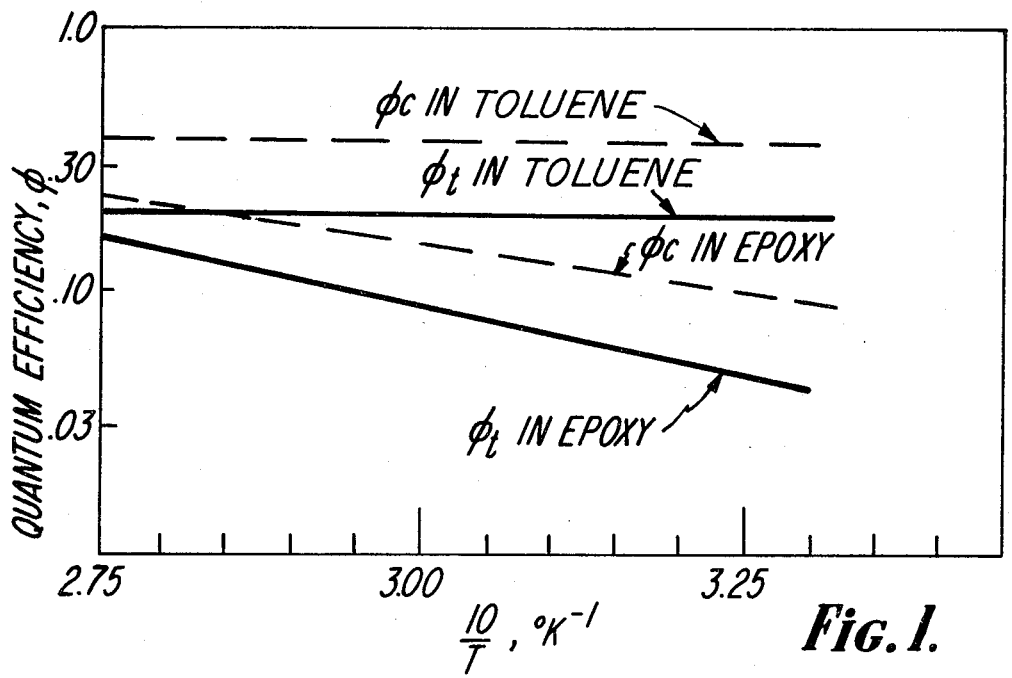
FIG. 1 is a graph showing the temperature dependence of the cis-trans photoisomerization quantum yields for 6-6' diisopropoxythioindigo dissolved in (a) a heat-cured epoxy matrix and in (b) toluene.

The novel photochromic elements include indigoid dyes dissolved in a polymeric host. Individual indigoid dyes can be prepared so as to absorb in different portions of the visible spectrum. A typical photochromic indigoid is thioindigo. The trans isomers of indigoids are normally the chemically more stable form of these dyes. Upon irradiation, the dye is raised to an excited state which permits the molecule to twist and when it decays back to a ground state a portion of the dye decays to the ground state of the cis isomer. The cis and trans isomers of the dyes absorb at different wavelengths. For example the trans isomer of thioindigo has its absorption maximum at about 540 millimicrons (m$\mu$), while the cis isomer of thioindigo has its absorption maximum at about 485 millimicrons (m$\mu$). This type of difference in absorption is typical of a large number of photochromic indigoids. Similarly, upon absorption of light by the cis isomer, this isomer is excited and a portion of the excited molecules decay back to the ground state of the trans isomer form, hence giving a reverse or erasure effect. In many of these dyes there is an appreciable amount of overlap of absorption spectra of the isomers and it is usually not possible to convert the mixture of isomers to either a 100 percent cis isomer or a 100 percent trans isomer. Instead, an equilibrium is generally established which is related to the fraction of the incident light absorbed by each isomer and the efficiency with which each isomer is photochemically converted to the other isomer. In addition to the conversion of one isomeric form to the other due to illumination of the photochromic element with light, there is a thermally induced reversion of the less stable form to the more stable form. In some materials this process is fast enough to influence the photostationary state thereby making the photochromic element relatively unstable for use in a storage device. However, the thermal reversion to the more stable isomeric state in the novel photochromic element is extremely slow and thus the photostationary state is essentially independent of the intensity of irradiation, and the stability of the novel photochromic element is satisfactory for use in a storage device.

Photochromic indigoids useful in the novel photochromic elements are represented by the structural formula

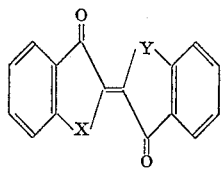

wherein X and Y are heteroatoms selected from the group consisting of sulfur, selenium and substituted nitrogen. Derivatives of these indigoids are also useful. For example, either symmetrical or unsymmetrical 6,6'-alkoxy substituted derivatives are useful.

Preferred photochromic elements for use in combination with an ionized argon laser for writing, erasing or reading information thereon comprises a 6-6'-dialkoxythioindigo as the photochromic dye. The absorption maximum of the trans and cis forms of dyes in this series almost coincide with the wavelengths available from the argon laser.

Although the diethoxy derivative of this series may be employed it has been found that by increasing the size of the alkoxy radicals the solubility of the dye in the polymeric hosts is increased. In addition, when the alkoxy radical is a branch-chain radical such as isopropyl or isobutyl, the melting point and solubility of the compound is substantially lowered as compared with compounds having the same number of carbon atoms in a straight chain configuration.

Useful polymeric hosts in which the aforementioned dyes are dissolved comprise resins which form cross-linked polymers. These polymers are preferably optically clear and are free of additives which may adversely react with the photochromic dyes dissolved therein. The useful polymeric hosts exhibit a glass transition in the temperature range of operation of the photochromic element. This glass transition temperature is for practical purposes preferably greater than room temperature and up to about 100°C. Room temperature is considered to be about 23°C.

A substantial temperature dependence of photochromic efficiency has been found in photochromic elements which comprise an indigoid dye dissolved in a cross-linked resin. Heat-curable epoxy resins are particularly useful as a host polymer. Preferred epoxy resins are glycidyl ethers of bisphenol-A or glycidyl ethers of other di-functional hydroxy compounds. Examples of such epoxy resins are Maraglas, Dow Epoxy Resin or Ciba-Araldites.

The photochromic element can be prepared for example by dissolving the dye in Maraglas which is supplied as a viscous liquid. The quantity of dye dissolved in the resin depends upon the desired optical density of the photochromic element and the extinction coefficient of the dye at the wavelengths of intended use. Typically dye solutions in the resin host are from about $10^{-3}$ to $10^{-5}$ molar. At concentrations significantly greater than $10^{-3}$ the photochromic effect may not be observed. On adding a catalyst and heat-curing at about 75° to 90°C., a hard, clear, cross-linked polymer of high optical quality is formed which contains the dye dissolved therein. This photochromic element is readily machined, ground and polished if desired. The presence of the dye in the resin does not interfere with the curing process.

Measurements made on one millimeter thick photochromic elements containing sufficient dye to give an optical density of about 1.0 (about $7 \times 10^{-4}$ molar) at the trans absorption maximum showed that the quantum efficiency ($\phi$) for both trans to cis ($\phi_t$) and cis to trans ($\phi_c$) isomerism had decreased markedly from those measured in fluid solution. However, it was observed that warming the novel element above about 35°C. produced a considerable increase in the quantum efficiencies. The behavior of the quantum efficiencies, $\phi_t$ and $\phi_c$, as a function of reciprocal absolute temperature in a novel photochromic element comprising 6-6'-diisopropoxythioindigo dissolved in Maraglas is shown in FIG. 1. This behavior is quite different from that seen in fluid solution. For example, as shown in the figure for the same dye dissolved in toluene, neither $\phi_t$ nor $\phi_c$ showed any change between 25°C. and 90°C. In contrast a linearly changing behavior was observed for the novel photochromic element between about 30°C. and 90°C.

It is believed that the temperature-dependent behavior of the photoisomerism quantum yield in epoxy hosts is related to changes in the viscosity of the media.

When a novel photochromic element is warmed and then cooled to a temperature of about the glass transition temperature of the polymer host or below and held at this temperature, a hysteretic phenomenon is observed. The effect is such that the values of $\phi_c$ and $\phi_t$ decrease with time approaching a limiting value considerably lower than would be predicted by an extrapolation of the reciprocal absolute temperature versus $\phi$-plot. The rate with which these limiting values are reached is somewhat faster the lower the temperature at which the sample is held. For example, for the diisopropoxythioindigo in Maraglas element the limiting value is about one-third the "fresh" value of $\phi$ at 30°C. Also, upon rewarming this element to above 35° the quantum yields again rise to their previously observed values. This hysteretic effect is linked to the fact that the polymer is going through a glass transition at about 30–35°C. and could in some instances be utilized to obtain greater contrast ratios in the novel photochromic elements but most important it results in greater stability of the photochromic element at the lower temperature.

Since the photochromic efficiencies of the novel photochromic elements are substantially greater at temperatures above room temperature than they are at room temperature a preferred use of the novel photochromic elements involves the steps of 1) warming the photochromic element for example to 90°C.; 2) erasing a previous image by irradiation of the element in the absorption band of a first isomer thus bringing the entire element to the isomer-rich photostationery state of the other or second isomer; 3) writing in a new image by exposure to a wavelength corresponding to the absorption band of one isomer and thus bringing about an image-wise conversion to the other isomer; and 4) cooling to below the glass transition temperature to reduce the switching efficiency thereby permitting read-out under the least destructive possible conditions. Read-out may be accomplished by irradiation of the photochromic element with light of a wavelength in either the trans or cis absorption band provided there is a sufficient change in optical density in the image at the wavelength selected.

The photochromic element can then be altered by repeating the above steps. It should be noted that any change in transmission of one portion of the element as compared with an adjacent portion of the element imparts an image in the element and that any change causing the disappearance of such a difference in transmission (whether it be a change in the background or the image or both) erases the image.

A preferred method for operating a novel photochromic element comprising a dialkoxythioindigo in a cross-linked polymer having a glass transition temperature of from greater than room temperature to about 100°C. is to first convert the element to the cis rich form by irradiation with light in the trans absorption band (preferably at the maxima), writing information with light at near the cis absorption maxima and reading at the trans absorption maxima. The reason for the above method is that the change in composition per unit energy of irradiation in these elements is greatest at the cis absorption maximum and that the greatest absolute change in optical density occurs at the trans absorption maximum. Thus a relatively small amount of energy is required at the cis absorption maximum to obtain a given optical density change and further that the largest optical density change and hence the greatest observable image contrast is obtained at the trans absorption maximum.

A comparison was made between a novel photochromic element comprising 6-6'-diisopropoxythioindigo in Maraglas and the same dye system in polystyrene, a non-cross linked resin. The polystyrene element showed a 30 percent loss of dye after switching the element from the cis to trans form and back again 100 times. In comparison the novel photochromic element showed no observable loss of dye even after switching 25,000 times. In addition the hysteretic effect observed in the cross-linked resins was absent in polystyrene.

Figure 2:
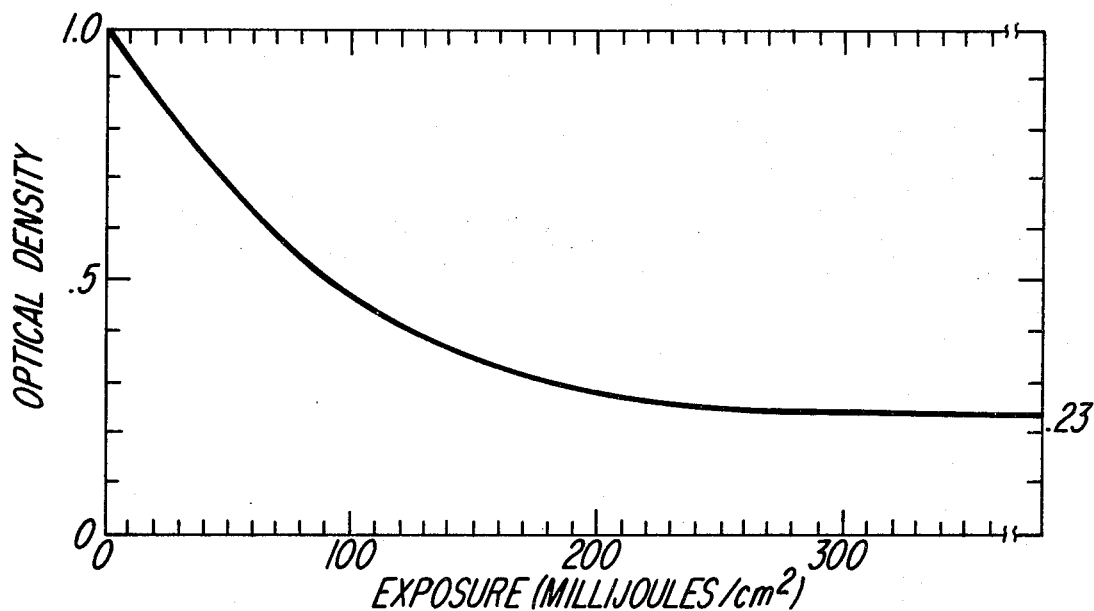
FIG. 2 is a graph showing the change in optical density with constant illumination of the photochromic element shown in FIG. 1 at 90°C. upon irradiation at at 514.50 millimicrons (m$\mu$) from an argon-ion laser.
Figure 3:
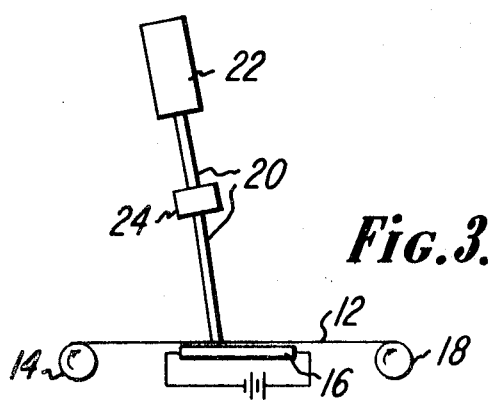
FIG. 3 is an elevational view of a system utilizing the novel photochromic element.

As previously stated, the absorption maximum of the trans and cis forms of dialkoxythioindigo dyes almost coincide with wavelengths available from the argon laser, that is, 458 millimicrons (m$\mu$) for the cis isomer absorption maximum and 514.50 millimicrons (m$\mu$) for the trans isomer absorption maximum. The graph shown in FIG. 2 indicates the change in optical density with constant illumination of a photochromic element comprising 6-6'-diisopropoxythioindigo in Maraglas. The photochromic element was illuminated with light from an argon ion laser of a wavelength of 514.50 millimicrons (m$\mu$) at a temperature of 90°C. Prior to illumination, the photochromic element was first brought to the trans-rich photostationary state by means of irradiation with the shorter wavelength (458 m$\mu$) from the argon ion laser. The data has been normalized so as to indicate an initial optical density of 1.0. It can be seen from the graph that the optical density changed from 1.0 to 0.23 representing the photostationary state after irradiation with light of 514.50 millimicrons (m$\mu$), the energy per unit area of which is somewhat greater than 200 millijoules/square centimeter. The maximum contrast ratio, defined as the anti-log of the difference of optical densities obtainable in this photochromic element is in excess of 5:1.

What is claimed is:

1. A method of operating a photochromic element comprising a photochromic indigoid dye in a polymeric host, said host having a glass transition temperature above room temperature including the steps of
   a. heating said element to a temperature above said glass transition temperature,
   b. writing an image on said heated element by irradiating the element with light of a wavelength within the absorption spectra of one photochromic state
   c. cooling said element to room temperature
   d. reading said image by irradiating said cooled element with light of a wavelength within the absorption spectra of one of the photochromic states.

2. A method of operating a photochromic element comprising an indigoid dye having cis and trans isomers dissolved in a polymeric host, said host having a glass transition temperature of between room temperature and 100°C. including the steps of
   a. converting said element to the cis rich photostationary state
   b. heating said element to a temperature greater than said glass transition temperature,
   c. writing an image on said heated element by irradiation with light of a wavelength in the cis isomer absorption band,
   d. cooling said element to room temperature and then
   e. reading said image with light of a wavelength in the trans isomer absorption band.

3. The method described in claim 4 wherein said writing wavelength is about equivalent to the wavelength of maximum absorption of said cis isomer and wherein said reading wavelength is about equivalent to the wavelength of maximum absorption of said cis isomer.

4. A photochromic element comprising a photochromic indigoid dye dissolved in a cross-linked polymer having a glass transition temperature between greater than room temperature and 100°C.

5. The photochromic element described in claim 6 wherein the indigoid dye is represented by the formula

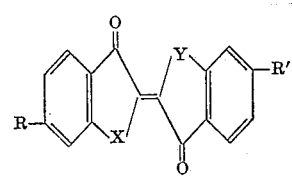

wherein X and Y are atoms from the group consisting of sulfur, selenium and substituted nitrogen and R and R' are selected from the group consisting of hydrogen and alkoxy radicals.

6. The photochromic element described in claim 5 wherein R and R' are branched chain alkoxy radicals.

7. The photochromic element described in claim 4 wherein said polymer is a heat curable epoxy derived from glycidyl ethers of di-functional hydroxy compounds.

8. The photochromic element described in claim 4 wherein the molar concentration of dye in said polymer is from about $10^{-3}$ to $10^{-5}$ molar.

9. A photochromic element comprising a photochromic indigoid dye dissolved in a cross-linked polymer host, said polymer host having a glass transition temperature above room temperature, said photochromic element characterized by an increasing efficiency above said glass transition temperature and a hysteresis effect of efficiency when cooled below said glass transition temperature.

* * * * *